Nov. 13, 1962  F. A. MORAN  3,064,170
ELECTRICAL MOTOR CONTROL SYSTEM
Filed Oct. 6, 1959
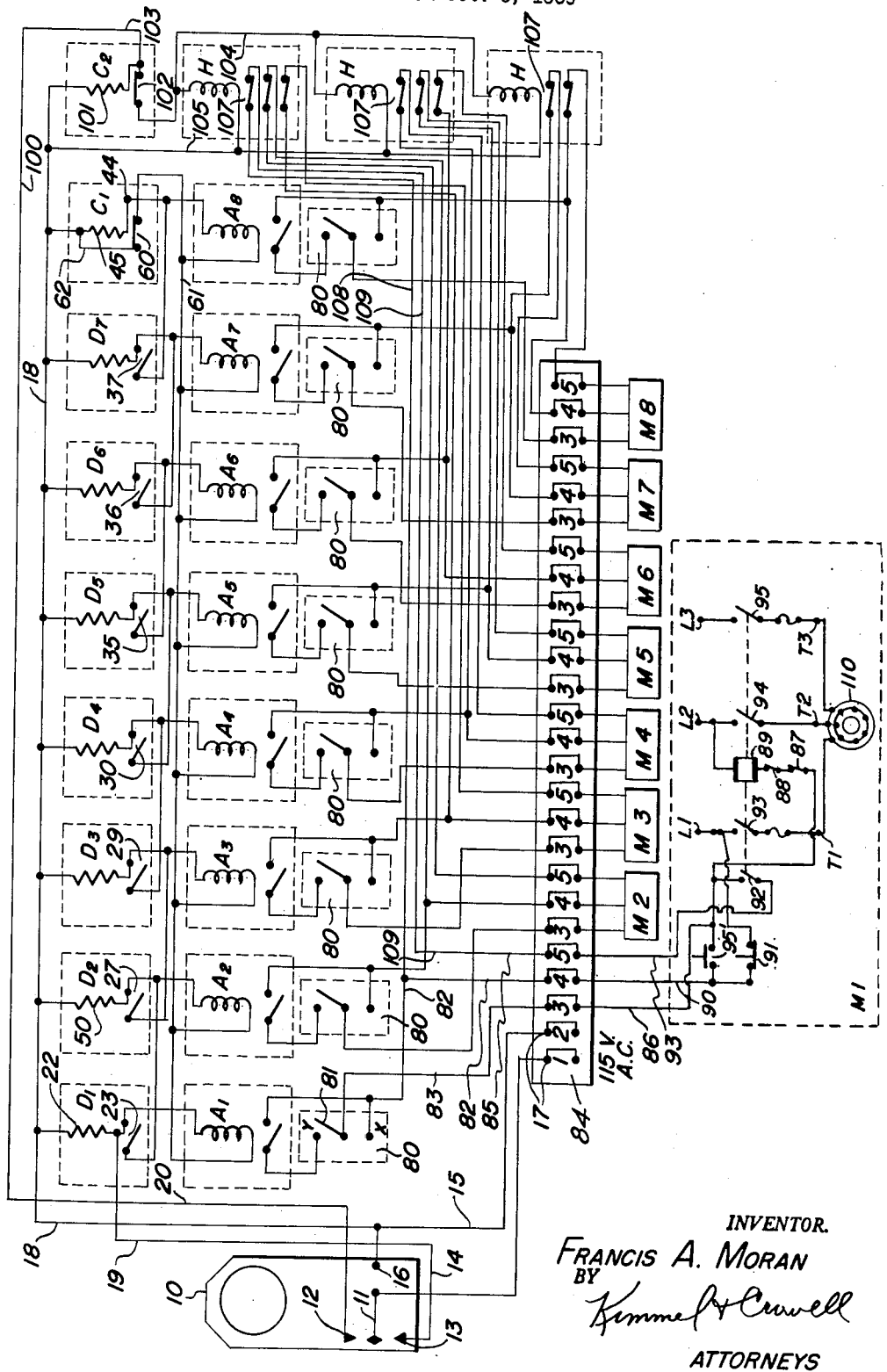
INVENTOR.
FRANCIS A. MORAN
BY
Kimmel & Crowell
ATTORNEYS United States Patent Office 3,064,170
Patented Nov. 13, 1962

3,064,170
ELECTRICAL MOTOR CONTROL SYSTEM
Francis A. Moran, Brooklyn, N.Y.
Filed Oct. 6, 1959, Ser. No. 844,657
18 Claims. (Cl. 318—102)

The present invention relates generally to time controlled switching systems and more particularly to a sequential switching system employing thermostatic switches for automatically controlling the time-sequential connection of apparatus to electrical power supply lines.

The system of the present invention is intended automatically to control electrical circuits so that they may be automatically energized in a desired sequence one at a time, with predetermined delays, and so that at termination of the sequence, the control circuits may be deactivated automatically and the electrical circuits returned to manual control. Intermediate manual control is also provided for. Briefly describing a specific embodiment of the invention as applied to sequential operation of electrical motors, a time or clock switch is set for a desired initiation time for a sequence of operations, such as the connection of plural motors or other loads or devices to electric power lines. When the time set into the time or clock switch arrives, a single circuit is closed by the clock switch. Closure of this single circuit results in energization of a first relay which in turn controls a circuit for connecting a first motor of a series to a power line. Simultaneously a heater coil of a first thermostatic switch is energized, which after a predetermined time closes a pair of normally open contacts, which in turn supply energy to a second relay, and to a second thermostatic switch. The second relay, when energized, initiates operation of a second motor. The second thermostatic switch in turn completes a circuit for a third relay and a third thermostatic switch. The latter in turn, after a predetermined time has elapsed, effects energization of a fourth thermostatic switch, and energization of a fourth relay, and so on for as many relays and thermostatic switches as are included in the system. Energization of each relay effects starting of an associated motor. Energization of the last relay in the system is accompanied by energization of the last heater coil of the last thermostatic switch of the motor starting system, which opens normally closed contacts. When opened, the contacts open the common line for all the preceding relays, disabling the relays and consequently returning all of the motors (or other loads or devices being controlled) to manual operation, so that these may be shut down individually as desired, or may be permitted to continue to run.

In the case of motor loads, at a time selected for electrical shut down of the system, the time switch closes a circuit which simultaneously energizes plural stop relays, the contacts of which are normally closed and which normally maintain circuits for holding coils for the magnetic starters of the motors. When the stop relays become energized the holding circuits are opened and the motors are automatically disconnected from their power circuits. In addition a heater coil of a stop thermostatic switch is energized. The latter switch, after a predetermined time, opens the energizing circuit of the stop relays, returning control of the motors to "manual." In the case of loads other than motors, analogous operations may be performed, which will be apparent to those skilled in the art.

The system accordingly operates automatically only during the start and stop cycle selected by the time switch and at all other times automatically returns the motors or other loads or devices subject to control to manual control. Wholly manual or non-automatic and/or stop control is also provided.

It is, accordingly, a broad object of the present invention to provide a novel system for sequential control of electrical circuits.

It is a further object of the invention to provide a novel system for the sequential control of electrical loads, such as electrical motors.

Still another object of the invention is to provide a novel system for the sequential connection of loads to electrical lines, sequential control being effected by means of thermostatic relays or switches.

A further object of the invention resides in the provision of a system for automatically controlling the connection of a plurality of loads to electrical lines by means of thermostatic switches, the several loads being connected to the lines each after a predetermined time delay following connection of the preceding load and for disconnecting all the loads from the electrical supply lines automatically at the end of a predetermined time.

A further object of the invention resides in the provision of a system for controlling the connection of loads to electrical lines automatically in sequence, or manually, as desired.

Still another object of the invention is to provide a system which establishes sequential energization of a plurality of loads, following which the loads are returned to manual control automatically, by the operation of a thermoelectric switching system.

The above and still further objects, features and advantages of the present invention will become apparent upon consideration of the following detailed description of one specific embodiment thereof, especially when taken in conjunction with the accompanying drawings, wherein the single FIGURE of the drawing is a schematic circuit diagram of a system according to the invention.

Referring now more specifically to the accompanying drawings, the reference numeral 10 denotes a timer or clock controlled switch, of conventional character per se, and which includes a movable switch arm 11, which may be switch selectively between two fixed contacts 12 and 13 by operation of the timer 10 and, more specifically, in which the movable switch arm 11 is initially moved into contact with contact 12 at a preset time, and after a predetermined elapse of time is moved into contact with contact 13. The movable switch arm 11 is directly connected to one power terminal 17, an associated common line 15 being connected to terminal 16 on the clock 10, such that making of contact 11 with contact 12 and contact 11 with contact 13, results in transfer of power from A.C. terminals 17 selectively to line pairs outgoing from the clock switch 10. The latter are identified by the reference numerals 18, 20 or 18, 19, the line 18 being a common line.

Contacts 11 and 13 are closed at a preset time, which completes a circuit through leads 18, 19 to a heater 22 of a thermostatic relay D1. One terminal of heater 22 is connected to the common line 18 and the other terminal of heater 22 is connected to one of normally open switch contacts 23 of thermostatic switch D1, the remaining contact being connected to one contact of second normally open thermostatic switch contacts 27 of a thermostatic switch D2. The remaining contact of the thermostatic switch D2 is connected to one contact of normally open contacts 29 of a third thermostatic switch D3, the remaining contact of the latter being connected to one contact of normally open contacts 30 of a fourth thermostatic switch D4. The remaining contact of switch 30 is connected to one contact of normally open contacts 35 of a fifth thermostatic switch D5. The remaining contact is connected to one contact of normally open contacts 36 of a sixth thermostatic switch D6. The remaining one of contacts 36 is connected to one contact of normally open contacts 37 of a seventh thermostatic switch D7 and the remaining contact is connected to one terminal 44 of a heater element 45 of an eighth thermostatic switch C1, the second terminal of which is connected to the common line 18.

The one contact of the thermostatic switch D1 is connected to one side of a heater coil 50 in the second thermostatic switch D2, the remaining contact of the heater element 50 being connected to the common lead 18. Similarly, the third, fourth, fifth, sixth and seventh thermostatic switches, D3, D4, D5, D6 and D7, each includes a heater element, one terminal of which is connected to the common line 18 and the other terminal of which is connected to the first menttioned side of the normally opened contact pairs of the thermostatic switches D1–D7, i.e., the contact which is connected directly to the associated one of relay A1–A7.

The thermostatic switch C1 includes normally closed contacts 60, one contact of which is connected to a line 61, and the remaining contact of which is connected via a lead 62 to the common line 18. Accordingly, line 61 is normally maintained at the same potential as the line 18, while the contacts 60 are closed, but is disconnected when the contacts 60 open.

In operation, closure of contacts 11, 13 of timer 10 energizes the heater coil 22 and simultaneously energizes a relay A1, one coil terminal of which is connected to the line 61 and the other coil terminal of which is connected to the line 19. Accordingly, immediately on reaching the time set into the timer 10 for initiating sequential operation the relay A1 is energized, and the heater 22 of thermostatic switch D1 is supplied with power. After a time determined by the constants of the thermostatic switch D1, i.e., on the operating time of the normally open contacts 23 and on the design of the heating coil 22, the normally open contacts 23 close, completing a circuit for the heater coil 50 of the thermostatic switch D2 and also completing a circuit for a relay coil A2. The relay A2 immediately energizes, and after a predetermined time the normally open contacts of the thermostatic switch D2 close, completing a circuit for the relay A3 and for the heater coil of the thermostatic relay D3. In this manner, relays A1 to A8, inclusive, respectively associated with thermostatic switches D1 to D7, inclusive, and C1 are energized in sequence, each after a time determined by the closure time for the preceding thermostatic switch.

When, however, the heating coil for the thermostatic switch C1 is energized, this results in opening of the normally closed contacts 60 of this switch, which disconnects the line 61 from the common lead 18, de-energizing all the relays A1 to A8, which signals completion of the starting sequence for the system.

Summarizing, the first relay A1 is closed directly by the clock switch 10. The first thermostatic switch is supplied with power simultaneously, and after a predetermined time elapse closes relay A2, and provides power for thermostatic relay D2. Sequential operation continues until relay A8 is energized, together with thermostatic relay C1. The latter, after elapse of time, opens the circuits to all of relays A1 to A8. The relays A1–A8 each controls one of motor starters M1 to M8. Each of the relays A1 to A8 includes a pair of normally open contacts and as the relays A1 to A8 are energized in sequence these contacts close in sequence. A separate manual switch 80 is associated with each of the relays A1 to A8, inclusive. The manual switches 80 each includes a switch arm 81 and upper and lower contacts identified by the letters Y and X, respectively. With the Y contact closed, the normally opened contacts of switch A1 are connected to lines 82, 83, which proceed respectively to contacts 4 and 3 on a terminal board 84. Each of the loads, which are electric motor starters in the system as described herein, although other loads may be substituted, is supplied with a third line 85, so that three terminals are required for each load, which are numbered 3, 4 and 5. The line terminal 2 is connected through lead 86 and normally closed contacts 87, 88 to a holding coil 89 for a motor starter circuit M1 and back to a line terminal L2. The terminal 4 is connected through a line 90 and a normally closed manual switch 91 to a power terminal L1. The terminal 5 proceeds to open contacts 92. Accordingly, when the contacts of relay A1 close, the holding coil 89 is energized, which in turn closes the set of contacts 92, 93, 94 and 95 (but does not open contacts 87, 88), so that power may be supplied from terminals L1, L2, L3 to output terminals T1, T2 and T3 connected to the exciting windings of motor 110. The switching sequence assumes a three phase motor load, connected to three phase terminals T1, T2, T3 but it will be appreciated that within the principles of the invention, other types of motor connection may be employed by appropriate modification of the circuitry, or other types of load instituted for motor loads.

Energization of the holding coil 89 establishes a holding circuit from contact 5 on terminal board 84 through line 93, now closed contacts 92, normally closed contacts 87, 88 and through the holding coil 89 to the terminal L2, the circuit being completed to the terminal 4, which is in turn connected directly to the terminal L1. Terminals 4 and 5 are normally connected together by leads 108 and 109 respectively connected thereto and to normally closed relay contacts 107. Accordingly, when the relay A1 is energized, and assuming switch arm 81 is in its upper position for automatic operation, the motor starter M1 closes contacts 93, 94, 95, which supplies power to the motor terminals T1, T2 and T3. The holding coil for the contacts 93, 94, 95 is locked in energized condition through the normally closed manual switch 91. In the stated condition, the circuit closure of a normally open switch 95' is ineffective to change the circuit configuration, but opening of the normally closed switch 91 breaks the circuit of the holding coil 89 and accordingly, opens the contacts 93, 94, 95 and de-energizes the motor. However, the motor starter may be controlled by the contacts 95', which provide a circuit through normally closed contacts 87, 88 for the holding coil 89, by-passing normally open contacts 92.

As the several thermostatic relays D1, D2, D3, D4, D5, D6, D7 are operated the several motor starter circuits M2 to M8 inclusive become operative, in the manner above described, and this occurs in sequence since the several thermostatic switches D1–D7 operate in sequence, each after a time delay.

When the last of the motor starter circuits has been energized, in response to energization of relay coil A8, the heater 45 of thermostatic switch C1 is also energized, and after a predetermined time opens the normally closed contacts 60 of thermostatic switch C1, which disables all the relays A1 to A8 by disconnecting the line 18 from line 61. The contacts of the relays A1 to A8 now open, but the motor starters remain in operating condition, since they are provided with the heretofore described locking circuits. Any motor starter may, however, be opened by opening the manual switch 91 associated therewith, and once opened may be re-energized by closure of the switch 95.

Similarly, by throwing the switches 81 into the down position, any one of the motor starters may be disconnected from the automatic sequencer and left on solely manual operation.

After a predetermined time, which may be previously set into the time switch 10, it is desired to shut down all the loads of the present system, which in terms of the specific embodiment of the invention described and illustrated implies disabling or de-energizing the several motor starters M1 to M8, inclusive. At this time the timing switch 10 operates to bring the movable arm 11 into contact with contact 12, which in turn provides potential to a line 100 and effects energization of heater coil 101 of a thermostatic relay C2 having normally closed contacts 102, one contact of which is connected via lead 103 to the power line 100, the other contact of which is connected to a bus 104. A parallel bus 105 is connected to the common lead 18. Connected across the buses 104, 105 are three relays H, in parallel, each of which is provided with normally closed contacts 107. As indicated in the drawings, three relays H are provided, two of which are provided with three contacts each and the remaining one of which is provided with two sets of contacts. This configuration is adopted for the sake of example only, the essential feature of this portion of the system being that a relay be provided which closes eight sets of contacts simultaneously. The sets of contacts 107 control disabling of the magnetic motor starters M1 to M8, respectively, in identical fashion, and accordingly the operation of one electrical set of contacts will be described in detail.

The contacts 107 are connected to lines 108, 109, which in turn proceed to terminals 4 and 5 on terminal board 84. Terminal 5 is connected to lead 93, which is in turn connected to holding coil 89 through now closed contact 92. Upon opening of normally closed contacts 107, accordingly, the circuit for holding coil 89 is broken and the starter de-energized. The open or closed condition of contacts 107 does not affect operation of manual switch 95, which is capable of providing a circuit for holding coil 89, traced from terminal L2 through holding coil 89, switch 95, switch 91, to terminal L1. This circuit is not available if switch 91 is manually opened.

Additionally, operation of thermostatic relay C2 serves to break its own circuit, which returns operation of the system to manual control.

The manual switches 80 are operable in top position Y for automatic operation, as hereinabove described. When in X position the system is manual, i.e., the motor starters M1-M8 can only be turned on manually. In center position, however, the system is arranged for manual turn on, but for automatic off operation, i.e., relay contacts 107 are operative but relays A1-A7 are not.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A sequential switching system, comprising a plurality of thermostatic switches each including a heater coil and a pair of contacts operated by the heater coil, said thermostatic switches being an ordered sequence of $n$ switches, $n-1$ of the contact pairs of said sequence being normally open and the $n$th contact pair being normally closed, a starter switch, means responsive to closure of said starter switch for energizing the heater coil of the first of said $n$ thermostatic switches, means responsive to closure of the normally open contacts of each of said $n-1$ thermostatic switches for energizing the heating coil of the succeeding thermostatic switch in said ordered sequence, means responsive to opening of said $n$th contacts for breaking the energizing circuit of all said $n$ heater coils, a plurality of loads each operatively associated with one of said thermostatic switches, means responsive to closure of said starter switch and to said $n-1$ thermostatic switches in sequence for connecting said loads in sequence to a power source in said sequence, said last named means including means for maintaining said loads connected to the power source after the energizing circuit of all of said heater coils is broken.

2. A sequential switching system, comprising a plurality of thermostatic switches each including a heater coil and a pair of contacts operated by the heater coil, said thermostatic switches being an ordered sequence of $n$ switches, $n-1$ of the contact pairs of said sequence being normally open and the $n$th contact pair being normally closed, a starter switch, means responsive to closure of said starter switch for energizing the heater coil of the first of said $n$ thermostatic switches, means responsive to closure of the normally open contacts of each of said $n-1$ thermostatic switches for energizing the heating coil of the succeeding thermostatic switch in said ordered sequence, means responsive to opening of said $n$th contact for breaking the energizing circuit of all said $n$ heater coils, a plurality of loads each operatively associated with one of said thermostatic switches, means responsive to closure of said starter switch and to said $n-1$ thermostatic switches in sequence for connecting said loads in sequence to a power source in said sequence, wherein said loads are motor starters.

3. The combination according to claim 2 wherein each of said motor starters includes a holding circuit for holding said each of said motor starters in operative condition in response to transient connection of said each of said motor starters to said power source.

4. The combination according to claim 3 wherein is provided means for selectively and at will breaking any ones of said holding circuits.

5. The combination according to claim 4 wherein is further provided a stop switch having only two contacts, means responsive to closure of said contacts for opening all said holding circuits simultaneously.

6. The combination according to claim 5 wherein said last means is a thermostatic switch having a heater coil and normally closed contacts, and wherein operation of said stop switch energizes the last named heater coil, and wherein said last means comprises at least one relay, and wherein power is supplied to said at least one relay via said last named normally closed contacts, whereby said at least one relay is disabled after being energized for a predetermined time.

7. A sequential switching system for connecting a plurality of $n$ electrical loads to a power source in a predetermined sequence and with predetermined time delays between connections, said loads having an ordered sequence from one to $n$, comprising a plurality of $n$ thermostatic switches forming an ordered sequence numbered from 1 to $n$, the switches numbered 1 to $n-1$ having each a heater coil and normally open contacts operable to closed condition after a predetermined application of electrical power to the associated heater coil, a start switch, means responsive to closure of said start switch for connecting the first of said loads to a power line and the first of said heater coils to said power line, means responsive to connection of each of said heater coils to said power line for connecting the heater coil next in sequence to said power line, means responsive to closure of each pair of normally closed contacts in said ordered sequence for connecting the load next in sequence to said power line, the $n$th thermostatic switch having normally closed contacts responsive to open on heating of the $n$th heater coil, and means responsive to opening of said $n$th contacts for disconnecting all said loads from said power line.

8. The combination according to claim 7 wherein each of said loads is a relay.

9. The combination according to claim 8 wherein each of said relays includes normally open contact pairs, and a separate motor starter connected in series circuit with each of said contact pairs.

10. The combination according to claim 9 wherein each of said motor starters includes a magnetic holding coil, and a set of normally open contacts arranged to connect a motor to a line when closed, each of said magnetic holding coils being in circuit with one only of said normally open contact pairs, a holding circuit for each of said magnetic holding coils, said holding circuits each including in series normally closed contacts and further normally open locking contacts arranged to close in response to energization of said holding coil.

11. The combination according to claim 10 wherein is provided means for simultaneously opening all said last named normally closed contacts.

12. The combination according to claim 10 wherein is provided a thermostatic switch, means for simultaneously opening all said last named normally closed contacts, said last mentioned switch means including a heater coil and a pair of normally closed contacts responsive to open on heating of said last mentioned heater coil and at least one relay coil for opening said all said last named normally closed contacts, said at least one relay coil being energized in series with said last named pair of normally closed contacts, and a circuit maker for energizing said last mentioned heater coil and for energizing said last named at least one relay coil via said last named pair of normally closed contacts.

13. A system for connecting a plurality of motors each to power lines in controlled sequence, a plurality of motor starters each operatively associated with a different one of said motors, each of said motor starters including a holding coil, sequential switch means for connecting said holding coils to a power circuit in ordered sequence, a holding circuit for each of said holding coils, said holding circuits beng each completed in response to energization of the associated holding coil, means for disabling said sequential switch means a predetermined time after termination of said sequence, time controlled means for opening all said holding circuits simultaneously, and manual means for at will opening any one of said holding circuits.

14. The combination according to claim 13 wherein said sequential switch means includes a plurality of thermostatic relays and an electromagnetic relay operatively associated with each of said thermostatic relays, each of said electromagnetic relays including normally open contacts connected in series with one of said holding coils and operable to closed condition in response to energization of the relay, a start switch for energizing one of said electromagnetic relays and the associated thermostatic relay, means responsive to said energization of each but one of said plurality of thermostatic relays for energizing one succeeding electromagnetic relay and the associated thermostatic relay, and means responsive to energization of the last of said plurality of thermostatic relays for disabling all said electromagnetic relays.

15. In a motor control system, a plurality of motor starters, time controlled means for connecting said motor starters in sequence to a power source, means responsive to connection of each of said motor starters to said power source for providing a holding circuit for holding that motor starter connected to said power source, means responsive to completion of said sequence for disabling said time controlled means and substituting manual means for at will connecting said motor starters to said power source, and switch means for simultaneously disconnecting all said motor starters from said power source.

16. The combination according to claim 15 wherein said time controlled means includes a plurality of thermostatic relays connected in self-sequencing configuration.

17. The system of claim 1 including means for at will de-energizing at least one of said loads.

18. The system of claim 1 including means for at will simultaneously de-energizing all of said loads.

References Cited in the file of this patent

UNITED STATES PATENTS

| | | |
|---|---|---|
| 1,552,235 | Russell | Sept. 1, 1925 |
| 2,056,619 | Reger et al. | Oct. 6, 1936 |
| 2,060,755 | Exner | Nov. 10, 1936 |
| 2,075,841 | Wertheimer | Apr. 6, 1937 |
| 2,311,438 | Hoyt | Feb. 16, 1943 |

OTHER REFERENCES

James and Macher: Controllers for Electric Motors, page 30; McGraw-Hill, New York, 1952. (Div. 26.)